Nov. 26, 1940.    O. G. TWEDDELL    2,223,136
HYDRAULIC CONTROL VALVE
Filed March 23, 1939    3 Sheets-Sheet 1

INVENTOR.
Oscar G. Tweddell
BY
ATTORNEY.

Nov. 26, 1940.　　　O. G. TWEDDELL　　　2,223,136
HYDRAULIC CONTROL VALVE
Filed March 23, 1939　　　3 Sheets-Sheet 2

INVENTOR.
Oscar G. Tweddell
ATTORNEY.

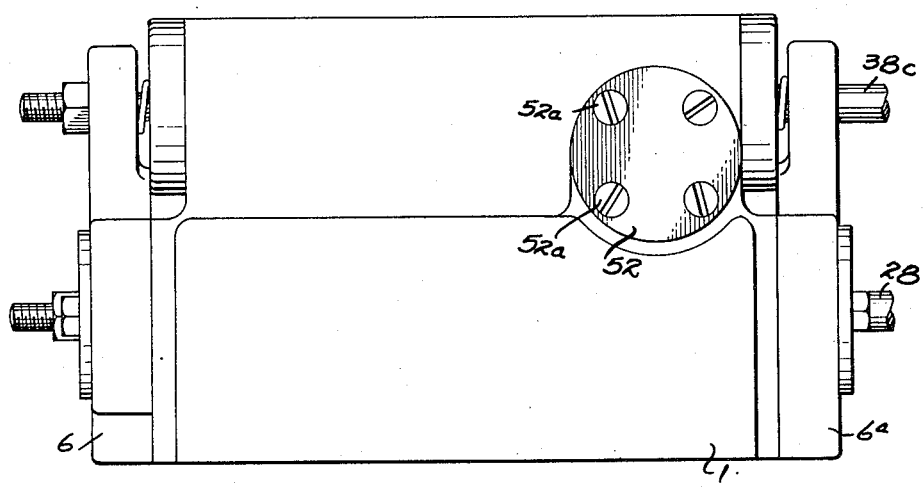
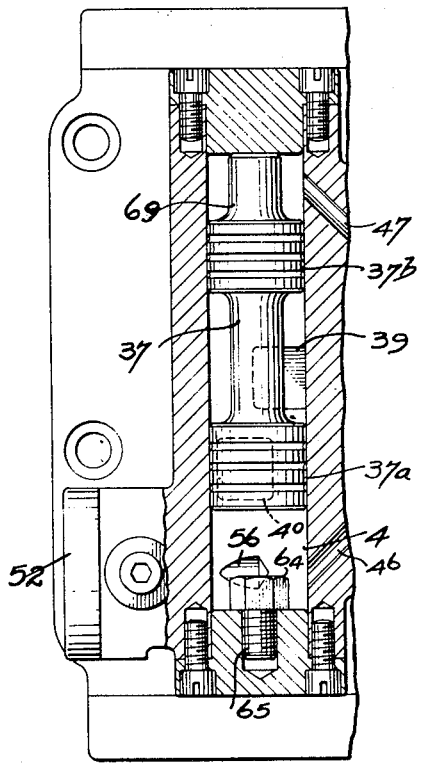
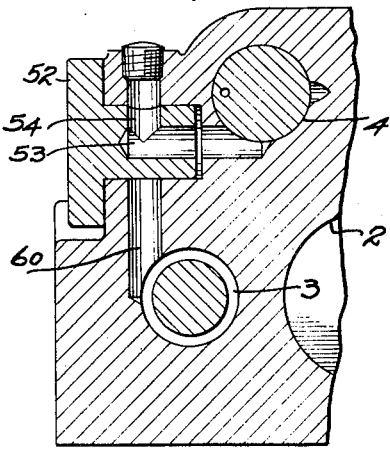

Patented Nov. 26, 1940

2,223,136

UNITED STATES PATENT OFFICE 2,223,136

HYDRAULIC CONTROL VALVE

Oscar G. Tweddell, Detroit, Mich., assignor to Le Maire Tool and Manufacturing Company, Dearborn, Mich., a corporation of Michigan Application March 23, 1939, Serial No. 263,721

3 Claims. (Cl. 121—46.5)

This invention relates to improvements in hydraulic control valves. At the present time many hydraulic control valves are in use by which hydraulic liquid flowing thereinto is selectively directed to either of two outlet connections through one or the other of which it passes to operate various types of mechanisms. It is however usual to arrange such valves so that the pressure is constantly maintained upon the liquid flowing through one or the other outlet connection, in spite of the fact that in many cases there are regular prolonged periods during which the pressure exerted by the liquid is not being employed. Consequently not only do the pumps and motors supplying the liquid under pressure do much unnecessary work and consume considerable power needlessly, but the temperature of the liquid is often needlessly increased, sometimes to a harmful extent.

It is an object of this invention to provide a hydraulic control valve including a distributing valve and a dump valve so arranged that the pressure on the liquid passing through the distributing valve may be relieved and the liquid allowed to flow back to the suction side of the pumping system whenever desired.

Another object of the invention is to provide a hydraulic control valve wherein a distributing valve is alternately moved to opposite ends of its cylinder by movement of a distributing pilot, and wherein by movement of a dump valve pressure may be built up in or released from the distributing valve. Thus by a cycle of movements pressure may be maintained in and released from the distributing valve. Such means for applying or releasing pressure in the actuating valve are frequently very helpful during tool setting, or the setting-up of a machine, as it provides a facile means for momentarily applying pressure and thus obtaining only slight movement of the mechanism operated by the liquid in either direction.

A further object of the invention is to provide a hydraulic control valve wherein to complete the cycle the distributing pilot is alternately moved in opposite directions to reverse the flow of the hydraulic liquid, and wherein means are provided for releasing the pressure in the distributing valve when the plunger therein has been moved in one direction, and for subsequently closing the release means.

Yet another object of the invention is to provide a hydraulic control valve wherein the means for releasing the pressure in the distributing valve may either be operated by movement of a dump pilot, or automatically by movement of the distributing valve.

Having thus briefly and broadly stated some of the objects and advantages of the invention I will now proceed to describe an embodiment thereof with the aid of the accompanying drawings, in which:

Figure 1 illustrates an end elevation of the invention.

Figures 2 and 3 are sections on the lines 2—2 and 3—3 respectively of Figure 1.

Figure 5 is a detail, in section, showing the rotary valve in closed position.

Figure 6 is a side elevation, and

Figure 7 is a partial sectional view showing the dump valve in the position it assumes when pressure is being exerted through the distributing valve.

Figure 1:
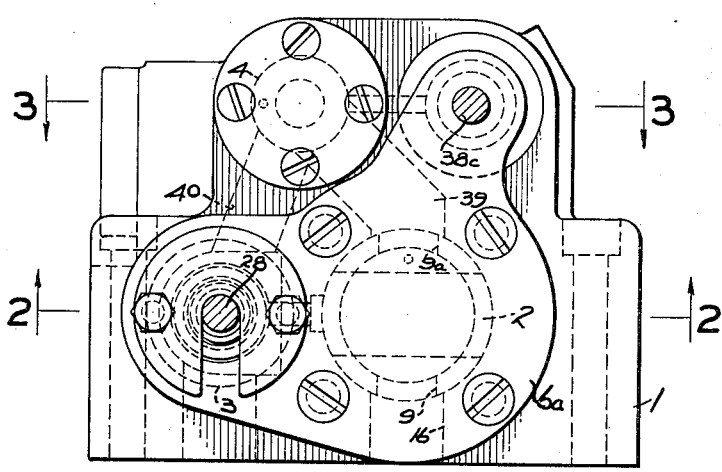

Referring to the drawings, I designates a casing, usually a casting, in which a distributing cylinder 2, a distributing pilot cylinder 3, a dump cylinder 4 and a dump pilot cylinder 5 are provided. These cylinders are all arranged parallel to one another and each extremity of all the cylinders may be closed by a common cover as shown at 6 and 6a.

A plunger 7, mounted for reciprocation in the distributing cylinder 2 which is of uniform bore throughout its length, has a chamber 8 formed therein intermediately of its ends, and extending radially through the plunger are opposed longitudinal slots 9 and 9a which open into the chamber 8. Formed through the wall of the distributing cylinder 2 centrally of its length is an inlet port 16, and the length of the slot 9 is such that the said inlet port is in communication with the chamber 8 through the said slot in all positions of the plunger. Extending radially through the plunger 7 from the chamber 8 towards each extremity of the latter are discharge ports 14 and 15 which are adapted to register with outlet ports 17 and 18 respectively formed through the cylinder 2. Through the latter, and terminating in the distributing pilot cylinder 3, relief ports 19 and 20 opposite the outlet ports 17 and 18 respectively are provided; and 10 and 11 denote transverse apertures formed through the plunger 7 towards its extremities. Thus when the plunger is at one end of its stroke the inlet port 16 is connected through the slot 9, the chamber 8 and the discharge port 14 with the outlet port 17, at which time the outlet port 18 is connected through the plunger aperture 11 with the relief port 20; and when the plunger is at the other end of its stroke the inlet port 16 is connected through the chamber 8 and discharge port 15 with the outlet port 18, and then the outlet port 17 is connected through the aperture 10 with the relief port 19. A small hole 21 is formed longitudinally through the plunger 7 from each extremity of the chamber 8. Extending from the cylinder 2 towards each extremity thereof to the cylinder 3 are ports 33 and 33a which are preferably somewhat inclined so that their ends opening into the said cylinder 3 are closer together than their opposite extremities. Formed through the casing 1 is a passage 39 which connects the distributing cylinder 2 with the dump cylinder 4, this passage being constantly in communication with the plunger slot 9a.

The distributing pilot cylinder 3 is provided with smaller bore portions 22 and 22a at its extremities and a larger central bore portion 23. The relief ports 19 and 20 open into the latter portion 23. A pilot 24 mounted for reciprocation in the cylinder 3 consists of two piston valves 25 and 25a around each of which an annular groove 26, or 26a, is formed intermediately of its length, and connected by a spacing rod 27. Projecting from one extremity of the pilot 24 is an actuating rod 28 which extends through a plate 30 mounted upon the cover 6a which is apertured; and extending from the outer face of the piston valve 25 to the plate 30, and arranged around the rod 28, is a coil spring 29. The inner extremity of the pilot 24 is, in the present instance, annular to receive a guide 31 which is axially movable through an opening formed through a plate 30a mounted upon the cover 6 which is also suitably apertured. Provided around the guide 31 and extending between the plate 30a and the inner extremity of the said guide which is of enlarged diameter and bears against the base of the annular opening formed in the pilot extremity, is a helical spring 29a. Thus the pilot 24 is spring balanced and tends to maintain its central position. Then the inner portions of the piston valves 25 and 25a close the grooves 26 and 26a from the enlarged central portion 23 of the cylinder 3, and the ports 33 and 33a are therefore not in communication with the said portion 23. When the pilot 24 is inwardly moved against the tension of the spring 29a, by inward pressure exerted upon the rod 28, the port 33 which opens at all times into the groove 26 is connected by the said groove with the enlarged portion 23 of the cylinder 3; and when the rod 28 is pulled outward the port 33a is connected with the central cylinder portion 23 through the groove 26a. Extending from the enlarged central cylinder portion 23 is a connection 34 which is intended to be connected to a reservoir for the hydraulic liquid—not shown. From that portion of the cylinder bore 22 with which the annular groove 26 is at all times in registry a passage 60 extends to which reference is made hereinafter.

The dump cylinder 4 and the dump pilot cylinder 5 are both of uniform diameter throughout their bore. Mounted in the cylinder 4 for reciprocating movement therein is a piston valve 37 having two spaced pistons 37a and 37b thereon, and 38 denotes a piston valve in the dump pilot cylinder 5. The valve 38 has two spaced pistons 38a and 38b and an outwardly projecting actuating rod 38c which extends through a suitable opening formed through the cover 6a. The outer faces of the pistons 38a and 38b are annular to receive the extremities of coil springs 43 and 44 respectively the opposite ends of which bear against the cylinder ends and tend to retain the piston valve 38 centrally in the cylinder 5.

The passage 39 opens into the dump cylinder 4 centrally of the length of the latter so that at all positions of the piston valve 37 at least the major portion of the mouth of the said passage is exposed between the pistons, or piston heads, 37a and 37b. Extending from the cylinder 4 somewhat nearer one extremity of the latter is a passage 40 which terminates in the central enlarged portion 23 of the distributing pilot cylinder 3 so that at all times the said passage 40 is in communication with the connection 34 to the reservoir (not shown). The mouth of the passage 40 in the dump cylinder 4 is so located that when the piston valve is at one extremity of its stroke this passage is connected with the passage 39, but when the valve 37 is moved the piston head 37a closes the said mouth and thus prevents the escape of hydraulic liquid through the passage 40. Formed through each piston head 37a and 37b is a small longitudinal aperture 61 to permit the cylinder ends to fill with liquid introduced into the cylinder 4 through the passage 39. Extending from the opposite extremities of the dump cylinder 4 to the cylinder 5 are ports 46 and 47 which are so inclined that their ends opening into the latter cylinder are materially closer together than their extremities opening into the cylinder 4. The cylinder 5 intermediately of its length is connected with the passage 40 by a tubular connection 48 for the escape of hydraulic liquid from between the pistons, or piston heads, 38a and 38b.

Extending into the dump cylinder 4 from a pad 63 is a stop 64, which, in the present instance, consists of a screw 65 in threaded engagement with an opening formed in the said pad. By adjustment of the stop one end position of the valve 37 may be varied to vary the size of the inlet into the passage 40. This is necessary because if only a relatively low pressure is exerted through the hydraulic liquid the opening of the passage must be more restricted to obtain movement of the valve 37.

Figure 4:
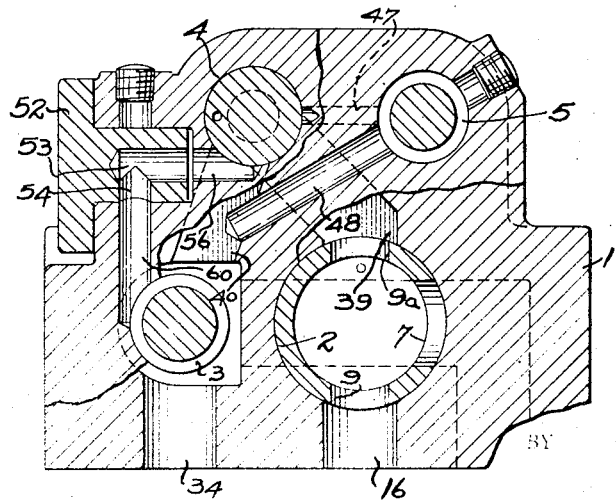
Figure 4 is a section on the line 4—4 of Figure 3.

Mounted for rotation in the casing 1 is a rotary valve 52, shown in open position in Figure 4 and in closed position in Figure 5. Through this valve 52 an axial opening 53 extends from its inner extremity. Provided through the valve from the opening 53 is a radial aperture 54 which, by rotation of the valve can be moved into or out of registry with the passage 60. Extending through the casing 1 from the cylinder 4 is an outlet 56 which terminates adjacent the base of the valve 52 and is in communication with the axial opening 53. Thus when the rotary valve is in open position a free flow is permitted from the extremity of the cylinder 4 adjacent the stop 64 into the annular groove 26 of the piston valve 25.

Figure 2:
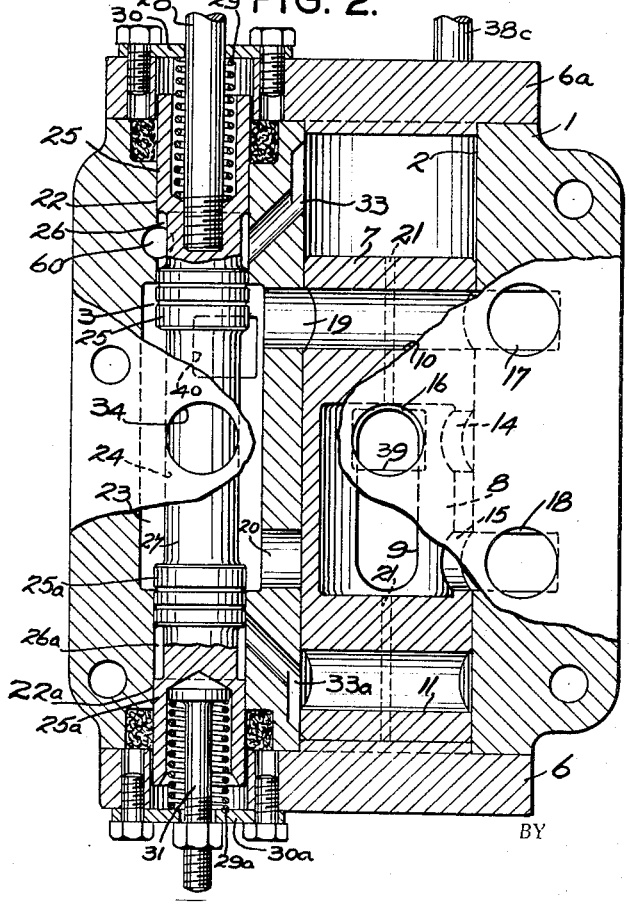

Having thus described a preferred form of construction of the invention I will now proceed to describe the operation thereof:

When the control valve is in operation the plunger 7 is at one extremity of its stroke so that the liquid flows through the inlet port 16, slot 9, chamber 8, and from the latter either through the ports 14 and 17, or 15 and 18; then the liquid is free to return through the port 18, or 17, the plunger aperture 11, or 10, and the relief port 20, or 19. Once in the enlarged portion 23 of the cylinder 3 liquid can of course flow through the connection 34 back to the supply side of the pumping system—not shown. As soon as liquid pressure is built up in the chamber 8 some of it flows through the small holes 21 into both extremities of the cylinder 2 so that a uniform pressure is maintained both in the chamber 8 and against both ends of the plunger 7. If, for instance, the plunger is to be moved from the position shown in Figure 2 upwardly, the pilot 24 is moved downwardly thereby connecting the groove 26 in the pilot with the enlarged cylinder portion 23. Then liquid under pressure is released from the upper end of the cylinder 2, through the port 33, groove 26 and thus into the enlarged cylinder portion 23. Then movement of the plunger 7 in the desired direction results.

Figure 3:
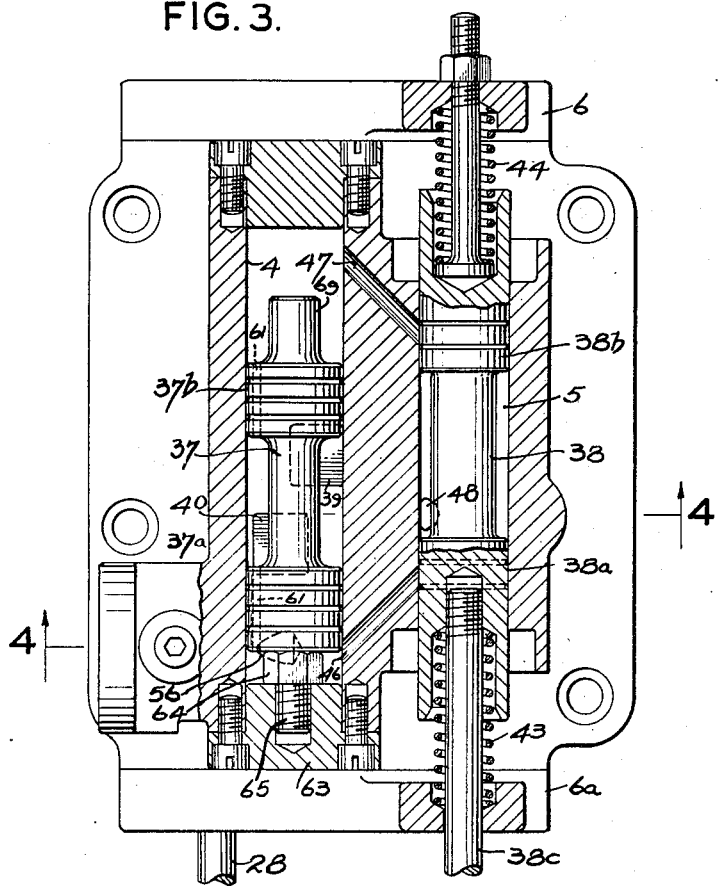

It may here be remarked that in order to maintain pressure in the hydraulic system the passage 40 in the dump cylinder 4 must be closed by the piston head 37a as shown in Figure 7. If the piston valve 37 is in the position shown in Figure 3 the liquid flows freely from the chamber 8, through the slot 9a and passage 39 into the cylinder 4 and from the latter through the passage 40 into the central enlarged portion 23 of the cylinder 3 and through the connection 34.

The operation of the piston valve 37 in the dump cylinder 4 is substantially the same as that of the plunger 7 in the cylinder 2. Liquid pressure is maintained both between the piston heads 37a and 37b and against the outer faces of the latter so that by releasing the pressure in either extremity of the cylinder 4 through one of the ports 46 or 47, or through the outlet 56, movement of the piston valve 37 results. Mounted on one extremity of the piston valve 37 to limit its movement in one direction is a fixed stop 69, and its movement in the other direction is limited by the adjustable stop 64. It will also be noted that after movement of the pilot 24, or 38, in either direction the springs 29 and 29a, or 43 and 44, immediately return that pilot to its central position shown in Figure 2, or 3.

If it is desired to maintain hydraulic pressure over prolonged periods through the control valve, or if the operating cycle is very rapid, the rotary valve 52 is closed as shown in Figure 5. Then the only valve movement consists of moving the rod 28 alternately in opposite directions to permit an escape of pressure through one or other of the ports 33 or 33a to the free outlet connection 34 from one end or the other of the cylinder 2. At intervals, such as when the machine is to remain stopped for a longer time interval, pressure from within the cylinder 2 is released by movement of the dump pilot valve 38. If this valve is moved downwardly pressure liquid from the underside of the piston valve 37a is released through the port 46 and passage 48 into the central portion of the distributing pilot cylinder 3, whence it escapes through the free outlet connection 34. Then the spaced piston valves 37a and 37b in the dump cylinder 4 move downward into the position shown in Figure 3 to permit the passage of liquid flowing from the distributing cylinder 2 through the passage 39 out through the passage 40 and thus to the free outlet connection 34 through the distributing pilot cylinder 3. In order then to again build up pressure in the distributing cylinder 2 the dump pilot piston 38 must be raised to permit a flow of pressure liquid through the port 47 to the port 48, and when this occurs the dump piston 37 moves upward so that liquid entering the cylinder 4 through the passage 39 cannot escape through the passage 40.

In practice it is found that the rotary valve should be closed when the operating cycle occurs at such frequent intervals that no useful purpose would be served in releasing the pressure between each cycle from the distributing valve. However there is usually an appreciable time interval each time the plunger 7 is at its raised position—that is between two consecutive working operations, since the holding or other mechanism (not shown) is actuated by the hydraulic liquid when the plunger is at its bottom position, and inoperative when the plunger is at its raised position.

When the rotary valve 52 is open as shown in Figure 4, a free flow of liquid occurs through the passages 39 and 40 to the free outlet connection 34 each time the plunger 7 rises and hydraulic liquid escapes through the port 33 to the connection 34, because then liquid also flows through the outlet 56 from the bottom of the dump cylinder 4, through the valve passages 53 and 54 and the passage 60 which at that time is in communication with the connection 34 since the piston valve 25 has then been moved to permit a flow from the port 33 to the said connection. Thus to operate the dump valve when the valve 52 is open it is only necessary to move the dump pilot valve 38 once during each operating cycle; that is to permit a flow through the port 47 to the passage 48 so that the piston valves 37a and 37b will be raised to close the passage 40, because the opening of the passage 40 occurs automatically as soon as the distributing pilot valve 25 is moved to permit a flow from the passage 60 to the free outlet connection 34. Whereas as previously explained the dump pilot valve 38 must be moved once to release pressure from the distributing valve, and a second time to prevent a free flow from the latter through the passage 39 during each operating cycle of the control valve, when the rotary valve 52 is in inoperative position. In order to prevent accidental rotation of the valve 52, means are provided, such as the screws 52a for positively retaining it in either open or closed positions.

While in the foregoing the preferred of the invention has been described and shown it is understood that the construction is susceptible to such alterations and modifications as fall within the scope of the appended claims.

What I claim is:

1. A hydraulic control valve comprising a distributing cylinder having a plunger mounted therein for reciprocation, said plunger having small apertures therethrough to permit the entry of hydraulic liquid into the cylinder extremities, an inlet and outlet ports through said cylinder, means in the plunger adapted to connect the inlet port with either outlet port, a distributing pilot cylinder having a free outlet connection, outlet passages from the distributing cylinder opening into the distributing pilot cylinder in constant communication with the free outlet connection, means in the plunger adapted to connect each outlet port with one of said outlet passages, ports connecting the ends of the distributing cylinder with the distributing pilot cylinder, spaced piston valves in the pilot cylinder adapted to close said connecting ports from the outlet connection, means for actuating the piston valve and connecting one port or the other with the outlet connection, a dump cylinder having spaced piston valves therein, a passage connecting the inlet port in the distributing cylinder with the dump cylinder between the spaced piston valves therein, an outlet from the dump cylinder terminating in a portion of the distributing pilot cylinder open at all times to the outlet connection, and means for moving the spaced piston valves in the dump cylinder to open or close a connection between the outlet therefrom and the passage connected to the inlet port.

2. A hydraulic control valve comprising the combination set forth in claim 1, wherein the means for moving the spaced piston valves in the dump cylinder to open the connection between the outlet therefrom and the passage connected to the inlet port consists in the provision of axial apertures through the piston valves in the dump cylinder, and an opening from one end of the dump cylinder terminating in the distributing pilot cylinder whereby movement of the spaced piston valves in the latter is adapted to connect said opening with the free outlet connection from the said distributing pilot cylinder.

3. A hydraulic control valve comprising the combination set forth in claim 1 wherein the means for moving the spaced piston valves in the dump cylinder to open and close the connection between the outlet therefrom and the passage connected to the inlet port consists of a dump pilot cylinder having spaced piston valves therein, a passage extending from the dump pilot cylinder at all times positioned between the piston valves therein connected to the free outlet connection, a port from each extremity of the dump cylinder opening into the dump pilot cylinder, the piston valves in the dump cylinder having small apertures axially therethrough, and means for moving the piston valve in the dump pilot cylinder to exhaust pressure liquid through either last named port selectively and through the passage connected to the free outlet connection whereby the dump piston valves are moved towards one extremity or the other of the cylinder.

OSCAR G. TWEDDELL.